United States Patent
Asami et al.

(10) Patent No.: US 10,401,649 B2
(45) Date of Patent: Sep. 3, 2019

(54) METHOD OF DESIGNING PROGRESSIVE REFRACTIVE POWER LENS, AND LENS SET

(71) Applicants: HOYA LENS THAILAND LTD., Prachatipat, Thanyaburi, Pathumthani (TH); Hiroshi Asami, Tokyo (JP); Ayumu Ito, Tokyo (JP)

(72) Inventors: Hiroshi Asami, Tokyo (JP); Ayumu Ito, Tokyo (JP)

(73) Assignee: HOYA LENS THAILAND LTD., Pathumthani (TH)

(*) Notice: Subject to any disclaimer, the term of this patent is extended or adjusted under 35 U.S.C. 154(b) by 88 days.

(21) Appl. No.: 15/576,262

(22) PCT Filed: May 26, 2016

(86) PCT No.: PCT/JP2016/065597
§ 371 (c)(1),
(2) Date: Nov. 21, 2017

(87) PCT Pub. No.: WO2016/190391
PCT Pub. Date: Dec. 1, 2016

(65) Prior Publication Data
US 2018/0157062 A1    Jun. 7, 2018

(30) Foreign Application Priority Data
May 26, 2015 (JP) .................. 2015-106886

(51) Int. Cl.
*G02C 7/02* (2006.01)
*G02C 7/06* (2006.01)

(52) U.S. Cl.
CPC ............. *G02C 7/027* (2013.01); *G02C 7/025* (2013.01); *G02C 7/028* (2013.01); *G02C 7/06* (2013.01); *G02C 7/061* (2013.01); *G02C 7/065* (2013.01)

(58) Field of Classification Search
CPC ........ G02C 7/027; G02C 7/025; G02C 7/028; G02C 7/06; G02C 7/061; G02C 7/065
(Continued)

(56) References Cited

U.S. PATENT DOCUMENTS 5,715,032 A * 2/1998 Isenberg .............. G02C 7/061
351/159.42
2012/0113393 A1 5/2012 Spivey et al.
(Continued)

FOREIGN PATENT DOCUMENTS

| CN | 102902078 A | 1/2013 |
| CN | 203250079 U | 10/2013 |

(Continued)

OTHER PUBLICATIONS

Nov. 28, 2018 Office Action issued in Chinese Patent Application No. 201680030216.X.
(Continued)

*Primary Examiner* — William R Alexander
(74) *Attorney, Agent, or Firm* — Oliff PLC

(57) ABSTRACT

When an addition power at a position corresponding to a fitting point within a prescription addition power is greater than a target addition power set according to a target distance, the target addition power is set as an addition power between a progression-start point and a progression-end point on a principal meridian, and in addition the average gradient of an addition power between the progression-start point and the fitting point is set to differ from an average gradient of an addition power between the fitting
(Continued)

point and the progression-end point. When the addition power at the position corresponding to the fitting point within the prescription addition power is equal to or smaller than the target addition power, a gradient of the addition power is made constant in a partial region including at least the fitting point between the progression-start point and the progression-end point on the principal meridian.

4 Claims, 14 Drawing Sheets

(58) Field of Classification Search
USPC .................................................... 351/159.42
See application file for complete search history.

(56) References Cited

U.S. PATENT DOCUMENTS

| 2015/0116657 | A1 | 4/2015 | Altheimer et al. | |
|---|---|---|---|---|
| 2015/0355480 | A1* | 12/2015 | Contet | G02C 7/028 351/159.42 |
| 2017/0115510 | A1* | 4/2017 | Kaga | G02C 7/06 |
| 2018/0149883 | A1* | 5/2018 | Asami | G02C 7/06 |

FOREIGN PATENT DOCUMENTS

| EP | 1688781 A1 | 8/2006 |
|---|---|---|
| EP | 2713198 A1 | 4/2014 |
| JP | H07-159737 A | 6/1995 |
| JP | 2549738 B2 | 10/1996 |
| JP | 4400549 B2 | 1/2010 |
| JP | 5566823 B2 | 8/2014 |
| WO | 2009140080 A3 | 12/2009 |

OTHER PUBLICATIONS

Jan. 8, 2019 extended Search Report issued in European Patent Application No. 16800095.8.
Aug. 30, 2016 International Search Report issued in International Patent Application No. PCT/JP2016/065597.
Sep. 4, 2018 Notice of Allowance issued in Japanese Patent Application No. 2017-520803.

* cited by examiner

US 10,401,649 B2

METHOD OF DESIGNING PROGRESSIVE REFRACTIVE POWER LENS, AND LENS SET

TECHNICAL FIELD

The present invention relates to a method of designing a progressive power lens and a lens set.

BACKGROUND ART

Spectacle lens types include not only mono-focal lenses, but also progressive power lenses.

Examples of conventional progressive power lenses includes a spectacle lens which has a corridor where the radius of curvature progressively changes along the principal meridian passing through approximately the center of the lens, so that a predetermined addition power is provided between the center of the distance portion and the center of the near portion on the principal meridian (see PTL 1).

In the progressive power lens according to PTL 1: a fitting point is set between the start point and the end point of the corridor; the average gradient of the addition power from the start-point of the corridor to the vicinity of the fitting point differs from the average gradient of the addition power from the vicinity of the fitting point to the end point of the corridor; and about 0.5 diopters of power is added to the distance power at the fitting point.

In prior art according to PTL 1, about 0.5 diopters of power is added to the distance power at the fitting point as the target addition power, regardless the addition power prescribed for each user (prescription addition power), hence a region about 2 m ahead, which is set as the target distance, can be clearly viewed, regardless the prescription addition power of the user.

CITATION LIST

Patent Literature

[PTL 1] Japanese Patent Application Publication No. H07-159737

SUMMARY OF INVENTION

Technical Problem

The prior art according to PTL 1 is a technique to make the addition power at the fitting point constant, regardless the prescription of the user, therefore all the prescription addition powers exceed the target addition power.

However the prescription addition power depends on the user, hence if the prescription addition power is small, the addition power has great change from the start point of the corridor to the vicinity of the fitting point, the aberration distribution is deteriorated and the optical performance is decreased.

It is an object of the present invention to provide a method of designing a progressive power lens which improves optical performance regardless the amount of the prescription addition power, and a lens set.

Solution to Problem

A method of designing a progressive power lens of the present invention is a method of designing a progressive power lens in which: an intermediate region where an addition power continuously changes is provided between a first region for providing a first power and a second region for providing a second power; a principal meridian is provided in the first region, the intermediate region and the second region, so that the principal meridian passes through a progression-start point at which the change in the addition power starts and a progression-end point at which the change in the addition power ends; a prescription addition power is set based on the difference between the first power and the second power; and a fitting point is set at a position between the progression-start point and the progression-end point, along an extended line of a portion of the principal meridian that passes through the first region. When an addition power at a position corresponding to the fitting point within the prescription addition power is greater than a target addition power which is set according to a target distance, the target addition power is set as an addition power between the progression-start point and the progression-end point on the principal meridian, and in addition, an average gradient of an addition power between the progression-start point and the fitting point is set to differ from an average gradient of an addition power between the fitting point and the progression-end point. When the addition power at the position corresponding to the fitting point within the prescription addition power is equal to or smaller than the target addition power, a gradient of the addition power is made constant in a partial region including at least the fitting point between the progression-start point and the progression-end point on the principal meridian.

In the present invention, the target distance is set in accordance with a target position to be clearly viewed by the user, and the target addition power is determined based on this target distance. When the addition power at a position corresponding to the fitting point is greater than the target addition power, the target addition power is set as the addition power between the progression-start point and the progression-end point on the principal meridian, regardless the amount of the prescription addition power, and in addition the average gradient of the addition power between the progression-start point and the fitting point is set to differ from the average gradient of the addition power between the fitting point and the progression-end point. Since a distance point of the fitting point can be fixed, the target distance can be clearly viewed regardless the prescription.

In contrast, when the addition power at the position corresponding to the fitting point is equal to or smaller than the target addition power, the gradient of the addition power is made constant in a partial region including at least the fitting point between the progression-start point and the progression-end point on the principal meridian, hence decrease in optical performance, due to an increase of the gradient of the addition power at the fitting point, can be prevented. Therefore an improvement in the experience of wearing spectacles can be expected.

In a preferable configuration of the present invention, when d represents the target distance, A represents a dimension between the progression-start point and the fitting point along the extended line, B represents a dimension between the fitting point and the progression-end point along the extended line, and ADD represents the prescription addition power, in the case of $(1/d) < \{A/(A+B)\} \times ADD$, the target addition power is set as the addition power between the progression-start point and the progression-end point on the principal meridian, and in addition the average gradient of the addition power between the progression-start point and the fitting point is set to differ from the average gradient of the addition power between the fitting point and the progression-end point, and in the case of $(1/d) \geq \{A/(A+B)\} \times ADD$, the gradient of the addition power is made constant in a partial region including at least the fitting point between the progression-start point and the progression-end point on the principal meridian.

In this configuration, the target addition power is set by setting the target distance d in advance. For example, when the target distance d is 2 m, the target addition power is 0.50 diopters (D).

Further, the expression $\{A/(A+B)\} \times ADD$ is determined using the dimension A, dimension B and prescription addition power ADD. The values of the dimension A and dimension B are set as preset values.

Therefore the addition power between the progression-start point and the progression-end point can be appropriately set based on a magnitude relationship between the target addition power determined by (1/d) and the expression $\{A/(A+B)\} \times ADD$.

A preferable configuration of the present invention includes: a first step of setting the target addition power according to the target distance; a second step of determining whether the addition power at the position corresponding to the fitting point within the prescription addition power is greater than the target addition power; and a third step of setting an addition power between the progression-start point and the progression-end point on the principal meridian based on a determination result in the second step. In the third step, when the addition power at the position corresponding to the fitting point within the prescription addition power is greater than the target addition power which is set according to the target distance, the target addition power is set as the addition power between the progression-start point and the progression-end point on the principal meridian, and in addition the average gradient of the addition power between the progression-start point and the fitting point is set to differ from the average gradient of the addition power between the fitting point and the progression-end point. When the addition power at the position corresponding to the fitting point within the prescription addition power is equal to or smaller than the target addition power, the gradient of the addition power is made constant in a partial region including at least the fitting point between the progression-start point and the progression-end point on the principal meridian.

In this configuration, the progressive power lens can be reasonably designed based on the first step to the third step.

A lens set of the present invention is a set of progressive power lenses in each of which: an intermediate region where an addition power continuously changes is provided between a first region for providing a first power and a second region for providing a second power; a principal meridian is provided in the first region, the intermediate region, and the second region, so that the principal meridian passes through a progression-start point at which the change in the addition power starts and a progression-end point at which the change in the addition power ends; a prescription addition power is set based on the difference between the first power and the second power; and a fitting point is set at a position between the progression-start point and the progression-end point, along an extended line of a portion of the principal meridian that passes through the first region, the lens set satisfying conditions that: the first region having different first powers can be selected; a plurality of prescription addition powers can be selected for the first region having the same first power; refractive indexes of materials are the same; and a design concept is consistent among the progressive power lenses. The lens set includes: a first lens in which an addition power at a position corresponding to the fitting point within the prescription addition power is greater than a target addition power which is set according to a target distance; and a second lens in which an addition power at a position corresponding to the fitting point within the prescription addition power is equal to or smaller than the target addition power. In the first lens, the target addition power is set as an addition power between the progression-start point and the progression-end point on the principal meridian, and in addition an average gradient of an addition power between the progression-start point and the fitting point is set to differ from an average gradient of an addition power between the fitting point and the progression-end point. In the second lens, a gradient of the addition power is made constant in a partial region including at least the fitting point between the progression-start point and the progression-end point on the principal meridian.

In the present invention, in the lens set satisfying the conditions that: the first region having different first powers can be selected; a plurality of prescription addition powers can be selected for the first region having the same first power; refractive indexes of materials are the same; and a design concept is consistent among progressive power lenses, an appropriate lens can be selected, depending on whether the addition power at the position corresponding to the fitting point within the prescription addition power is greater than the target addition power. Therefore regardless what lens of a lens group is selected, discomfort is barely experienced when changing lenses to update to a stronger prescription addition power ADD due to the progress of presbyopia.

DESCRIPTION OF EMBODIMENT

An embodiment of the present invention will be described with reference to the drawings.

Figure 1A:
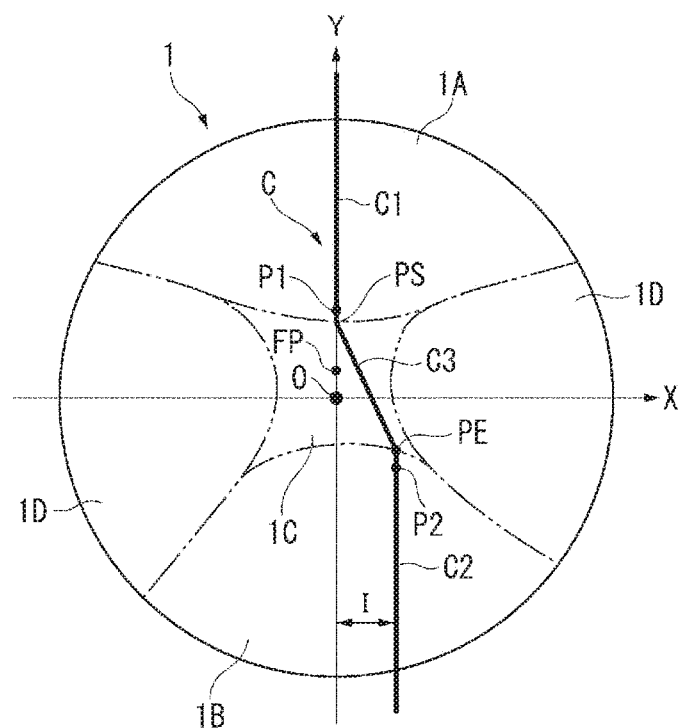
FIG. 1A is a schematic plan view depicting a progressive power lens designed by a method of designing a progressive power lens according to an embodiment of the invention.

FIG. 1A is a plan view of a progressive power lens.

As illustrated in FIG. 1A, a progressive power lens 1 includes a first region 1A for providing a first power D1, a second region 1B for providing a second power D2, an intermediate region 1C disposed between the first region 1A and the second region 1B, and side regions 1D which are disposed on both sides of the intermediate region 1C.

The first region 1A is a region for distance vision and the second region 1B is a region for near vision. The intermediate region 1C is a progressive surface where an addition power changes continuously. In the progressive power lens 1 designed in this embodiment, an eyeball side is a progressive surface, and an object side is a spherical surface.

A principal meridian C is a line along a position on the lens where the line of sight passes most frequently when the distance vision is shifted to the near vision in the state of wearing the progressive power lens (when the line of sight is moved from the upper part to the lower part of the lens).

A progression-start point PS is set at a position on the principal meridian C, where a change in the addition power starts, and a progression-end point PE is set at a position on the principal meridian C, where a change in the addition power ends.

The principal meridian C is constituted by: a linear portion C1 which corresponds to the first region 1A and is set on a vertical Y axis; a linear portion C2 which corresponds to the second region 1B and is set to be parallel with the Y axis and distant from the Y axis in an X axis direction by dimension I; and a linear portion C3 which corresponds to the intermediate region 1C and connects the progression-start point PS and the progression-end point PE.

In the first region 1A, a first measurement reference point P1 is set to measure an amount of the first power provided in the first region 1A. The first measurement reference point P1 is set in an upper vicinity of the progression-start point PS on the principal meridian. For example, the first measurement reference point P1 may be disposed at the center of a first power measurement reference circle (not illustrated), and the progression-start point PS coincides with the arc of the first power measurement reference circle.

In the second region 1B, a second measurement reference point P2 is set to measure an amount of the second power provided in the second region 1B. The second measurement reference point P2 may be set in a lower vicinity of the progression-end point PE on the principal meridian C. For example, the second measurement reference point P2 may be disposed at the center of the second power measurement reference circle (not illustrated), and the progression-end point PE coincides with the arc of the second power measurement reference circle.

A fitting point FP is set at a position between the progression-start point PS and the progression-end point PE, along an extended line of the linear portion C1 of the principal meridian C. In this embodiment, the extended line is a part of the Y axis located in the intermediate region 1C.

The fitting point FP is set at the first region 1A side of a lens center O in FIG. 1A, but may coincide with the lens center O, or may be set at the second region 1B side of the lens center O.

Figure 1B:
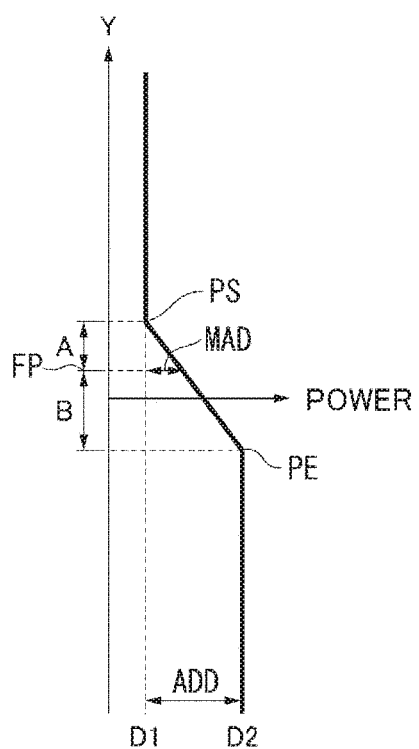
FIG. 1B is a graph depicting the relationship between the power and the position on the principal meridian, which schematically shows the progressive power lens designed by the method of designing the progressive power lens according to an embodiment of the invention.

In FIG. 1B, a power at a position on the principal meridian C is illustrated.

As illustrated in FIG. 1B, on the principal meridian C, the power is a first power D1 diopters in the linear portion C1 from the first region 1A to the progression-start point PS, increases from the D1 diopters to a D2 diopters in the linear portion C3 from the progression-start point PS to the progression-end point PE, and remains at the D2 diopters in the linear portion C2 from the progression-end point PE to the lower part of the second region 1B.

The difference of the addition power between the progression-start point PS and the progression-end point PE is a prescription addition power ADD, which is set according to the prescription of the user, and ADD=D2−D1.

Here it is assumed that a dimension along the Y axis between the progression-start point PS and the fitting point FP is A, and a dimension along the Y axis between the fitting point FP and the progression-end point PE is B. In this embodiment, the dimensions of A and B are default values, and are set to appropriate values during designing.

The method of designing the progressive power lens in this embodiment will be described next.

[First Step]

A target addition power FAD is set according to a target distance d. The target distance d here is a distance to a target position at which the user can clearly see, regardless the amount of the prescription addition power ADD.

The target addition power FAD is determined by the expression $1/d$. For example, if the target distance d is 2 m, the target addition power FAD is 0.50 diopters (D).

[Second Step]

An addition power MAD at a position corresponding to the fitting point FP, within the prescription addition power ADD, is determined.

The addition power MAD can be determined by the expression $\{A/(A+B)\} \times ADD$.

In other words, the ratio of the prescription addition power ADD and the addition power MAD is equal to the ratio of: the dimension (A+B) between the progression-start point PS and the progression-end point PE along the Y axis direction, and the dimension A between the progression-start point PS and a position corresponding to the fitting point FP along the Y axis direction.

Then it is determined whether the addition power MAD at the position corresponding to the fitting point FP, within the prescription addition power ADD, is greater than the target addition power FAD.

Furthermore, in the graph in FIG. 1B, a segment connecting the progression-start point PS and the progression-end point PE on the principal meridian is a line, but in some cases, an end portion of the segment on the progression-start point PS side and an end portion of the segment on the progression-end point PE side may be gently curved, and the positions of the progression-start point PS and the progression-end point PE may be unclear. In such a case, the progression-start point PS may be determined as an intersection between an extended line of a middle portion of the segment connecting the progression-start point PS and the progression-end point PE and the first power D1, and the progression-end point PE may be determined as an intersection between an extended line of the middle portion of the segment connecting the progression-start point PS and the progression-end point PE and the second power D2.

[Third Step]

The addition power between the progression-start point PS and the progression-end point PE on the principal meridian C is set based on the determination result in the second step.

When the addition power MAD at the position corresponding to the fitting point FP, within the prescription addition power ADD, is greater than the target addition power FAD, in other words, in the case of (1/d)< {A/(A+B)}×ADD, the target addition power FAD is set as the addition power between the progression-start point PS and the progression-end point PE on the principal meridian C, and the average gradient of the power between the progression-start point PS and the fitting point FP is set to differ from the average gradient of the power between the fitting point FP and the progression-end point PE.

When the addition power MAD at the position corresponding to the fitting point FP, within the prescription addition power ADD, is equal to or smaller than the target addition power FAD, in other words, in the case of (1/d) {A/(A+B)}×ADD, the gradient of the addition power between the progression-start point PS and the progression-end point PE on the principal meridian C is made constant.

According to this embodiment, the following effects can be obtained.

When the addition power MAD at the position corresponding to the fitting point FP, within the prescription addition power ADD, is greater than the target addition power FAD which is set according to the target distance d, the target addition power FAD is set as the addition power between the progression-start point PS and the progression-end point PE on the principal meridian C, and the average gradient M of the addition power between the progression-start point PS and the fitting point FP is set to differ from the average gradient N of the addition power between the fitting point FP and the progression-end point PE. Thereby the distant point at the fitting point FP can be fixed, and the target distance can be clearly seen, regardless the prescription addition power ADD.

When the addition power MAD at the position corresponding to the fitting point FP, within the prescription addition power ADD, is equal to or smaller than the target addition power FAD, the gradient of the addition power is made constant in a partial region including at least the fitting point FP between the progression-start point PS and the progression-end point PE on the principal meridian C. Thereby decrease in optical performance, due to a large gradient of the addition power at the fitting point FP, can be prevented.

Whether the addition power MAD at the position corresponding to the fitting point FP, within the prescription addition power ADD, is greater than the target addition power FAD is determined based on the magnitude relationship between the target addition power FAD=(1/d) and the addition power MAD={A/(A+B)}×ADD, where d is the target distance, A is a dimension between the progression-start point PS and the fitting point FP along the Y axis, B is a dimension between the fitting point FP and the progression-end point PE along the Y axis, and ADD is the prescription addition power, hence the addition power between the progression-start point PS and the progression-end point PE can be appropriately set.

The method of designing the progress power lens includes: the first step of setting the target addition power FAD; the second step of determining whether the addition power MAD at the position corresponding to the fitting point FP is greater than the target addition power FAD; and the third step of setting the addition power between the progression-start point PS and the progression-end point PE, hence the progressive power lens can be reasonably designed based on the first to third steps.

To confirm the effects of this embodiment, examples and comparative examples will be described next with reference to FIG. 2 to FIG. 12.

[Embodiment 1]

Figure 2:
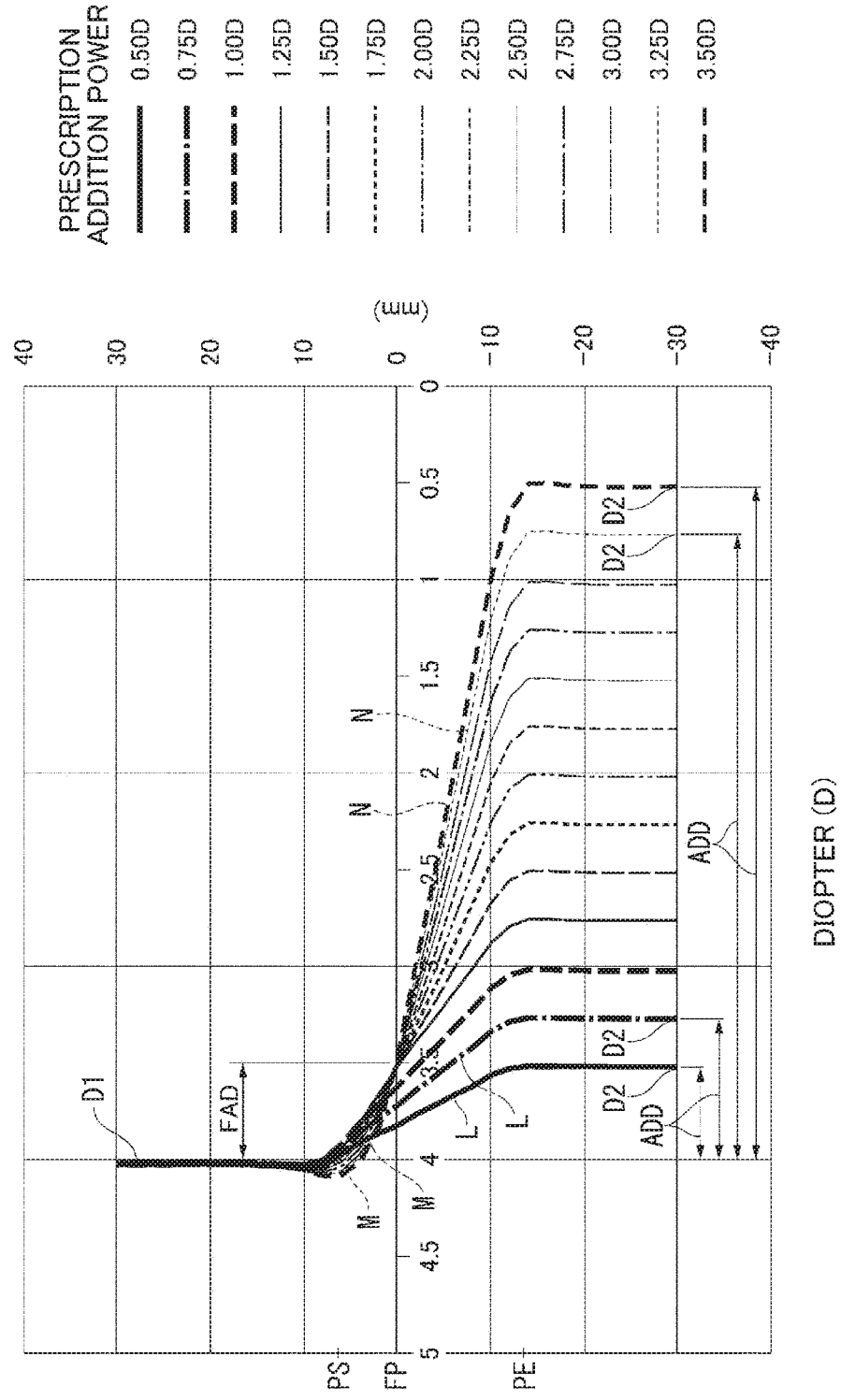
FIG. 2 is a graph depicting the designing method according to Embodiment 1, and shows the relationship between the power and position on the principal meridian when the prescription addition power is changed.

FIG. 2 depicts Embodiment 1.

FIG. 2 shows a relationship between the position on the principal meridian and the addition power in a plurality of progressive power lenses, in which the first power D1 is fixedly set to 4.00 diopters (D), and the prescription addition power ADD is set from 0.50 diopters (D) to 3.50 diopters (D) in 0.25 diopter (D) interval. When the prescription addition power ADD is 0.50 diopters (D), the second power D2 is 3.50 diopters (D), and when the prescription addition power ADD is 3.50 diopters (D), the second power D2 is 0.50 diopters (D). In other words, the lens group shown in FIG. 2 is primarily intended for indoor use, and is used for an office lens to see an area at intermediate distance (about 3 m to about 5 m) to an area close at hand. The office lens allows the user to see an area at the intermediate distance to an area at near distance by vertically moving the line of sight.

In Embodiment 1, the target distance d is 2 m, and the target addition power FAD is 0.50 diopters (D). The fitting point FP is set at the origin O of the Y axis, the dimension A is set to 8 mm, and the dimension B is set to 12 mm.

When the prescription addition power ADD is 0.50 diopters (D), the addition power MAD at the position corresponding to the fitting point FP is {A/(A+B)}×ADD=0.4 ×0.50=0.20 diopters (D), which is smaller than the target addition power FAD of 0.50 diopters (D).

When the prescription addition power ADD is 1.00 diopters (D), the addition power MAD at the position corresponding to the fitting point FP is {A/(A+B)}×ADD=0.4×1.00=0.40 diopters (D), which is smaller than the target addition power FAD of 0.50 diopters (D).

When the prescription addition power ADD is 1.25 diopters (D), the addition power MAD at the position corresponding to the fitting point FP is {A/(A+B)}×ADD=0.4×1.25=0.50 diopters (D), which is equal to the target addition power FAD of 0.50 diopters (D).

When the prescription addition power ADD is 1.50 diopters (D), the addition power MAD at the position corresponding to the fitting point FP is {A/(A +B)}×ADD=0.4×1.50=0.60 diopters (D), which is greater than the target addition power FAD of 0.50 diopters (D).

When the prescription addition power ADD is 1.75 diopters (D), the addition power MAD at the position corresponding to the fitting point FP is {A/(A+B)}×ADD=0.4×1.75=0.70 diopters (D), which is greater than the target addition power FAD of 0.50 diopters (D).

As described above, according to Embodiment 1 depicted in FIG. 2, when the prescription addition power ADD is 1.25 diopters (D) or more, the addition power MAD at the position corresponding to the fitting point FP is 0.50 diopters (D) or more, which is equal to or greater than the target addition power FAD. In this case, the target addition power FAD of 0.50 diopters (D), is set as the addition power between the progression-start point PS and the progression-end point PE on the principal meridian C, and in addition the average gradient M of the addition power between the progression-start point PS and the fitting point FP is set to differ from the average gradient N of the addition power between the fitting point FP and the progression-end point PE.

When the prescription addition power ADD is less than 1.25 diopters (D), on the other hand, the addition power MAD at the position corresponding to the fitting point FP is less than 0.50 diopters (D), which is smaller than the target addition power FAD. In this case, the progression-start point PS and the progression-end point PE are connected by a line L on the principal meridian C, so as to make the gradient of the addition power constant.

Furthermore, in various embodiments including the later mentioned embodiments, in some cases, the line L may not be a line in the strictest sense, but may be gently curved in the vicinity of the progression-start point PS and in the vicinity of the progression-end point PE. In Embodiment 1, it is sufficient if the gradient of the addition power is constant in a partial region, which at least includes the fitting point FP.

Figure 3:
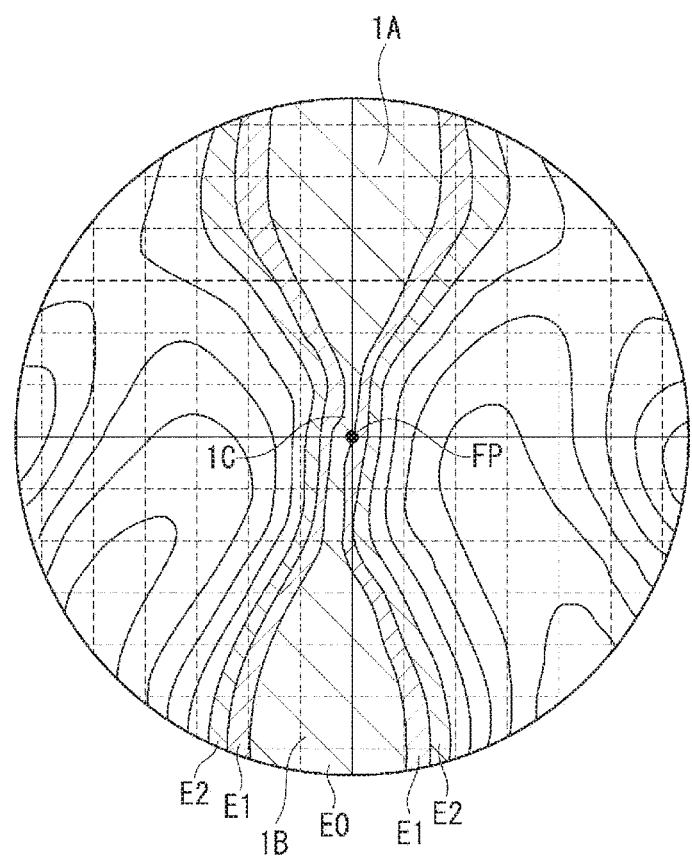
FIG. 3 is an aberration map of an example of the progressive power lens designed according to Embodiment 1.

FIG. 3 is an aberration map of the progressive power lens designed in Embodiment 1, in which prescription addition power ADD is 1.00 diopters (D). In FIG. 3, the aberration is depicted in a 0.10 diopter interval, with the fitting point FP at the center.

In FIG. 3, E0 is a region in which aberration is the smallest (0.00-0.10 diopters (D)). E1 is a region in which aberration is the next smaller (0.10-0.20 diopters (D)), and E2 is a region in which aberration is the next smaller (0.20-0.30 diopters (D)).

As depicted in FIG. 3, the region E0 in which aberration is the smallest, is located in the center portion of the first region 1A, the center portion of the intermediate region 1C, and the center portion of the second region 1B. The fitting point FP passes through the region E0. The region E1 is located outside the region E0, and the region E2 is located on both sides of the region E1.

[Embodiment 2]

Figure 4:
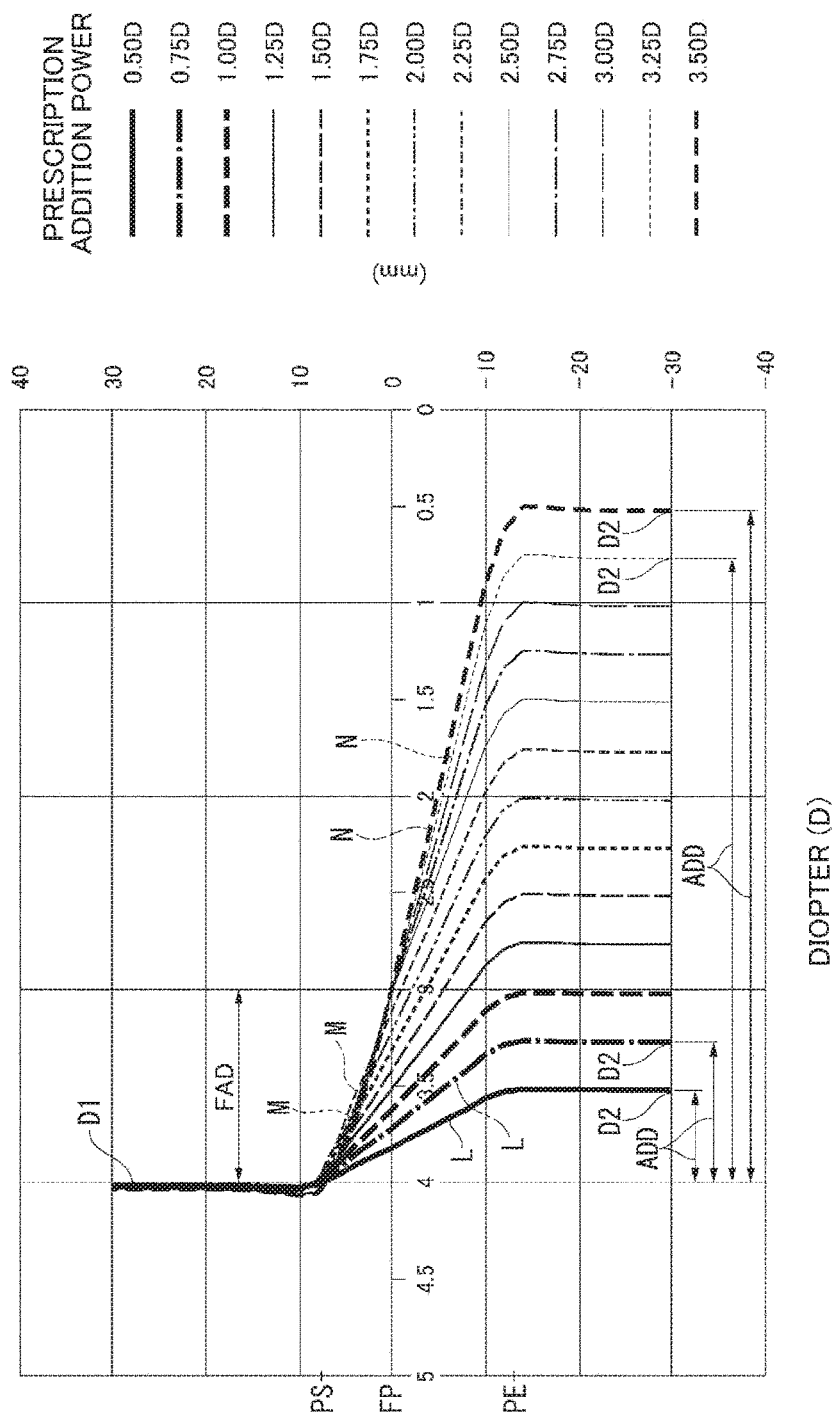
FIG. 4 is a graph depicting a designing method according to Embodiment 2, and shows the relationship between the power and position on the principal meridian when the prescription addition power is changed.

FIG. 4 depicts Embodiment 2.

In Embodiment 2, the target addition power FAD is different from Embodiment 1, but the other conditions are the same as Embodiment 1.

In Embodiment 2, the target distance d is 1 m, and the target addition power FAD is 1.00 diopters.

When the prescription addition power ADD is 0.50 diopters (D), the addition power MAD at the position corresponding to the fitting point FP is 0.20 diopters (D), which is smaller than the target addition power FAD of 1.00 diopters (D).

When the prescription addition power ADD is a 2.25 diopters (D), the addition power MAD at the position corresponding to the fitting point FP is {A/(A+B)}× ADD=0.4×2.25=0.90 diopters (D), which is smaller than the target addition power FAD of 1.00 diopters (D).

When the prescription addition power ADD is 2.50 diopters (D), the addition power MAD at the position corresponding to the fitting point FP is {A/(A+B)}× ADD=0.4×2.50=1.00 diopters (D), which is equal to the target addition power FAD of 1.00 diopters (D).

When the prescription addition power ADD is 3.00 diopters (D), the addition power MAD at the position corresponding to the fitting point FP is {A/(A +B)}× ADD=0.4×3.00=1.20 diopters (D), which is greater than the target addition power FAD of 1.00 diopters (D).

When the prescription addition power ADD is 3.50 diopters (D), the addition power MAD at the position corresponding to the fitting point FP is {A/(A+B)}× ADD=0.4×3.50=1.40 diopters (D), which is greater than the target addition power FAD of 1.00 diopters (D).

As described above, according to Embodiment 2 depicted in FIG. 4, when the prescription addition power ADD is 2.50 diopters (D) or more, the addition power MAD at the position corresponding to the fitting point FP is 1.00 diopters (D) or more, which is equal to or greater than the target addition power FAD. In this case, the target addition power FAD of 1.00 diopters (D), is set as the addition power between the progression-start point PS and the progression-end point PE on the principal meridian C, and in addition the average gradient M of the addition power between the progression-start point PS and the fitting point FP is set to differ from the average gradient N of the addition power between the fitting point FP and the progression-end point PE.

When the prescription addition power ADD is less than 2.50 diopters (D), on the other hand, the addition power MAD at the position corresponding to the fitting point FP is less than 1.00 diopters (D), which is smaller than the target addition power FAD. In this case, the progression-start point PS and the progression-end point PE are connected by a line L on the principal meridian C, so as to make the gradient of the addition power constant.

Figure 5:
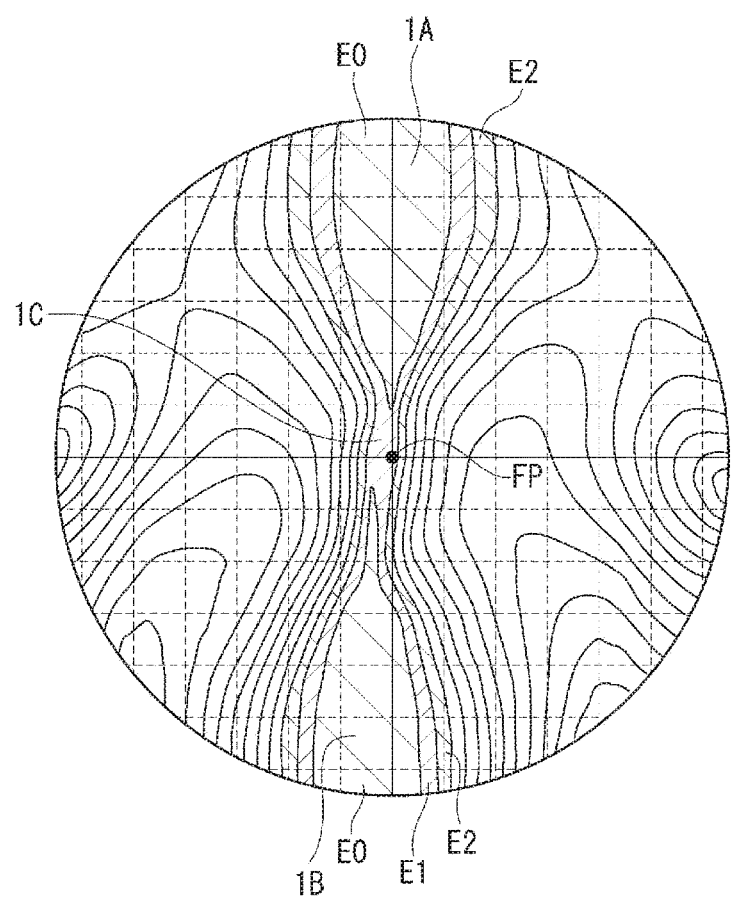
FIG. 5 is an aberration map of an example of the progressive power lens designed according to Embodiment 2.

FIG. 5 is an aberration map of the progressive power lens designed in Embodiment 2, in which prescription addition power ADD is 1.50 diopters (D). In FIG. 5, the aberration is depicted in a 0.10 diopter interval, with the fitting point FP at the center.

In FIG. 5, E0 is a region in which aberration is the smallest (0.00-0.10 diopters (D)), E1 is a region in which aberration is the next smaller (0.10-0.20 diopters (D)), and E2 is a region in which aberration is the next smaller (0.20-0.30 diopters (D)).

As depicted in FIG. 5, the region E0 in which aberration is the smallest is located in the center portion of the first region 1A, and the center portion of the second region 1B. The region E1 is located outside the region E0 and in the intermediate region 1C, and the fitting point FP passes through the region E1. The region E2 is located on both sides of the region E1.

[Embodiment 3]

Figure 6:
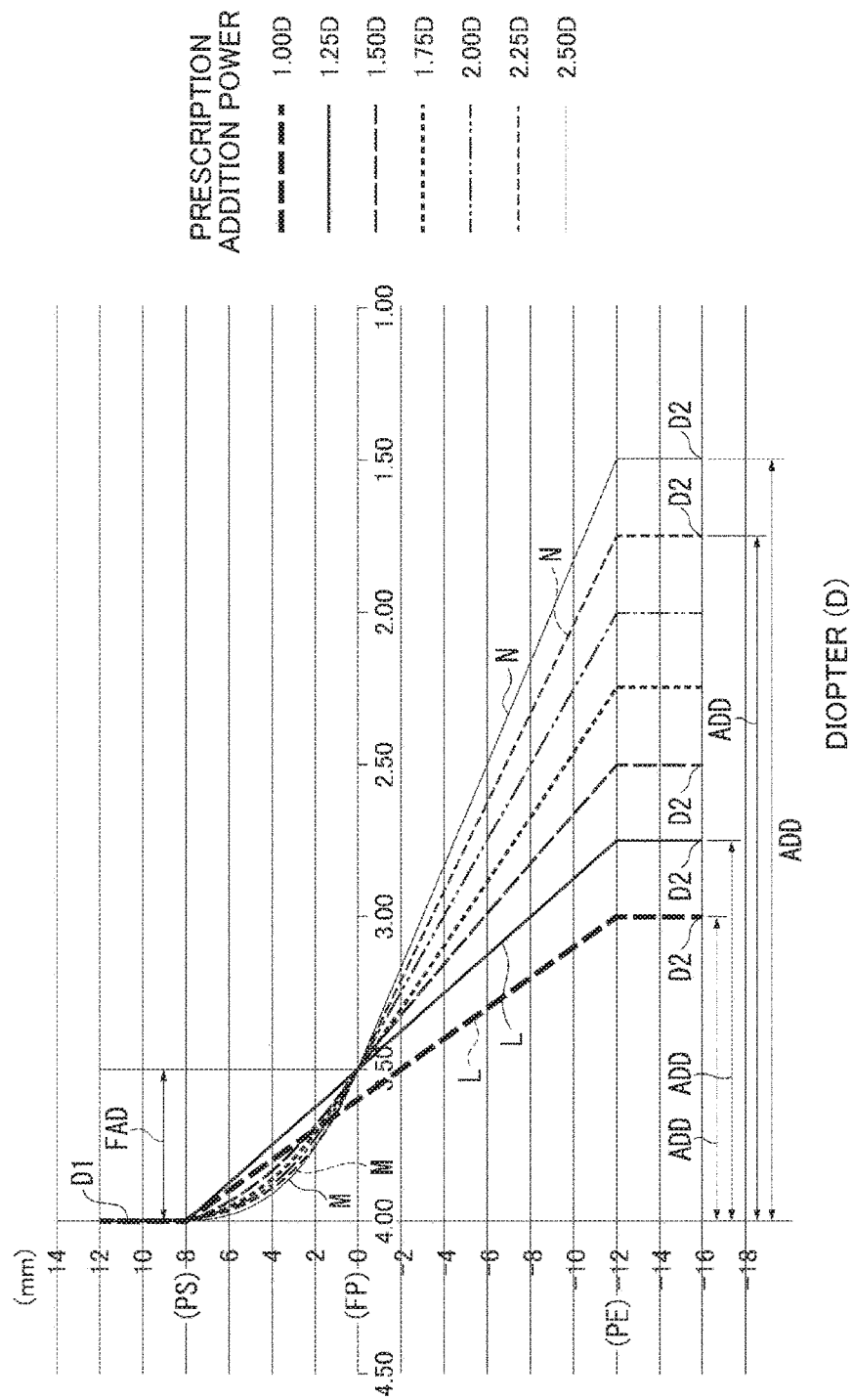
FIG. 6 is a graph depicting a designing method according to Embodiment 3, and shows the relationship between the power and position on the principal meridian when the prescription addition power is changed.

FIG. 6 depicts Embodiment 3.

FIG. 6 shows the relationship between the position on the principal meridian and the addition power in a plurality of progressive power lenses, in which the first power D1 is fixedly set to 4.00 diopters (D), and the prescription addition power ADD is set from 1.00 diopters (D) to 2.50 diopters (D) in 0.25 diopter (D) interval. The principal meridian C in the first region 1A is on the Y axis, and the fitting point FP is located at the O position, which is the origin of the Y axis.

When the prescription addition power ADD is 1.00 diopters (D), the second power D2 is 3.00 diopters (D), and when the prescription addition power ADD is 2.50 diopters (D), the second power D2 is 1.50 diopters (D).

In Embodiment 3, the target distance d is 2 m, and the target addition power FAD is 0.50 diopters. The dimension A is set to 8 mm, and the dimension B is set to 12 mm.

When the prescription addition power ADD is 1.00 diopters (D), the addition power MAD at the position corresponding to the fitting point FP is {A/(A+B)}×

ADD=0.4×1.00=0.40 diopters (D), which is smaller than the target addition power FAD of 0.50 diopters (D).

When the prescription addition power ADD is 1.25 diopters (D), the addition power MAD at the position corresponding to the fitting point FP is {A/(A+B)}×ADD=0.4×1.25=0.50 diopters (D), which is equal to the target addition power FAD of 0.50 diopters (D).

When the prescription addition power ADD is 1.50 diopters (D), the addition power MAD at the position corresponding to the fitting point FP is {A/(A+B)}×ADD=0.4×1.50=0.60 diopters (D), which is greater than the target addition power FAD of 0.50 diopters (D).

When the prescription addition power ADD is 1.75 diopters (D), the addition power MAD at the position corresponding to the fitting point FP is {A/(A+B)}×ADD=0.4×1.75=0.70 diopters (D), which is greater than the target addition power FAD of 0.50 diopters (D).

As described above, according to Embodiment 3 depicted in FIG. 6, when the prescription addition power ADD is 1.25 diopters (D) or more, the addition power MAD at the position corresponding to the fitting point FP is 0.50 diopters (D) or more, which is equal to or greater than the target addition power FAD. In this case, the target addition power FAD of 0.50 diopters (D), is set as the addition power between the progression-start point PS and the progression-end point PE on the principal meridian C, and in addition the average gradient M of the addition power between the progression-start point PS and the fitting point FP is set to differ from the average gradient N of the addition power between the fitting point FP and the progression-end point PE.

When the prescription addition power ADD is less than 1.25 diopters (D), on the other hand, the addition power MAD at the position corresponding to the fitting point FP is less than 0.50 diopters (D), which is smaller than the target addition power FAD. In this case, the progression-start point PS and the progression-end point PE are connected by a line L on the principal meridian C, so as to make the gradient of the addition power constant.

[Embodiment 4]

Figure 7:
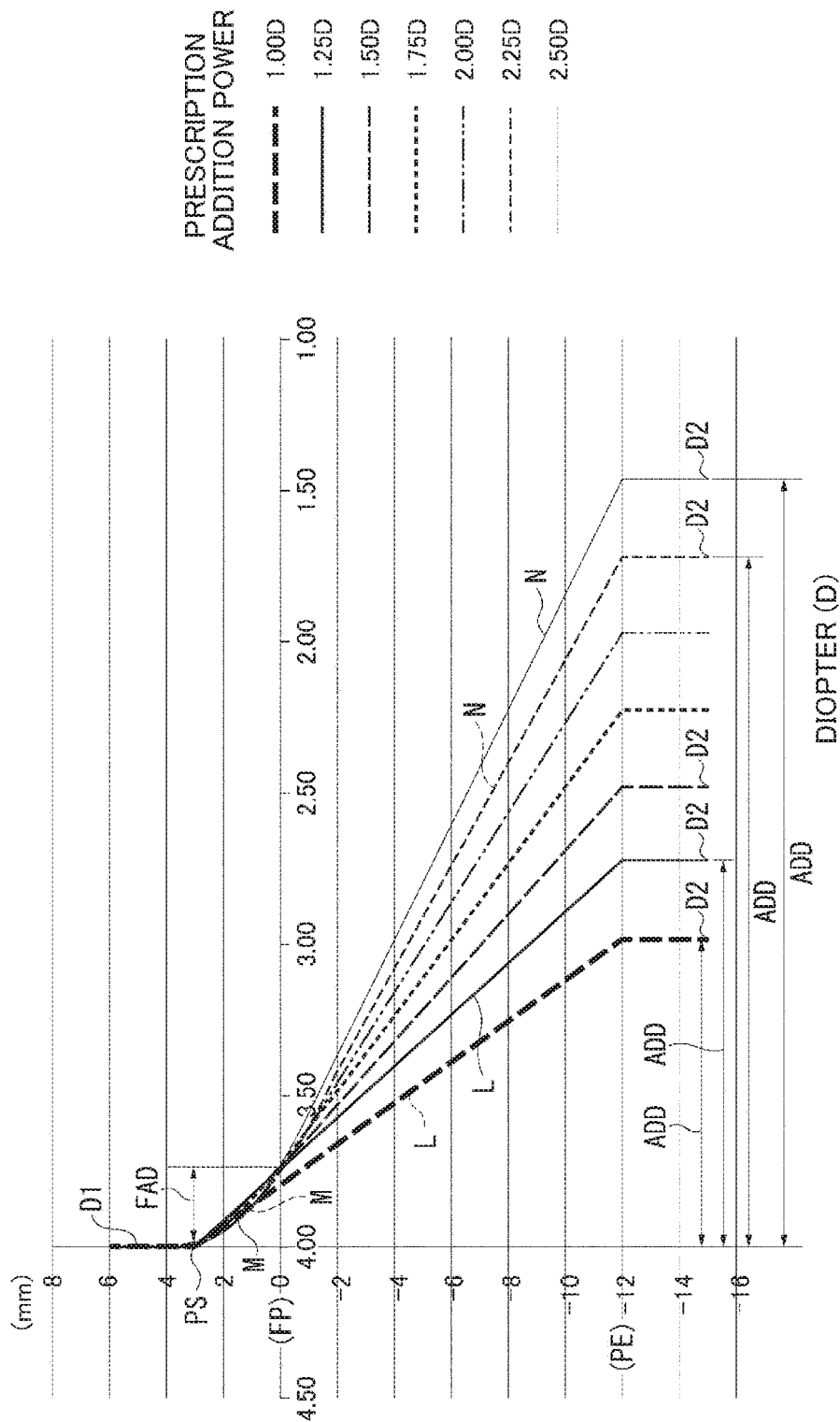
FIG. 7 is a graph depicting a designing method according to Embodiment 4, and shows the relationship between the power and position on the principal meridian when the prescription addition power is changed.

FIG. 7 depicts Embodiment 4.

In Embodiment 4, the dimension A, the dimension B and the target addition power FAD are different from Embodiment 3, but the other conditions are the same as Embodiment 3.

FIG. 7 shows a relationship between the position on the principal meridian and the addition power in a plurality of progressive power lenses, in which the first power D1 is fixedly set to 4.00 diopters (D), and the prescription addition power ADD is set from 1.00 diopters (D) to 2.50 diopters (D) in 0.25 diopter (D) interval. The principal meridian C in the first region 1A is on the Y axis, and the fitting point FP is located at the O position, which is the origin of the Y axis.

In Embodiment 4, the target distance d is 4 m, and the target addition power FAD is 0.25 diopters. The dimension A is set to 3 mm, and the dimension B is set to 12 mm.

When the prescription addition power ADD is 1.00 diopters (D), the addition power MAD at the position corresponding to the fitting point FP is {A/(A+B)}×ADD=0.2×1.00=0.20 diopters (D), which is smaller than the target addition power FAD of 0.25 diopters (D).

When the prescription addition power ADD is 1.25 diopters (D), the addition power MAD at the position corresponding to the fitting point FP is {A/(A+B)}×ADD=0.2×1.25=0.25 diopters (D), which is equal to the target addition power FAD of 0.25 diopters (D).

When the prescription addition power ADD is 1.50 diopters (D), the addition power MAD at the position corresponding to the fitting point FP is {A/(A+B)}×ADD=0.2×1.50=0.30 diopters (D), which is greater than the target addition power FAD of 0.25 diopters (D).

When the prescription addition power ADD is 1.75 diopters (D), the addition power MAD at the position corresponding to the fitting point FP is {A/(A+B)}×ADD=0.2×1.75=0.35 diopters (D), which is greater than the target addition power FAD of 0.25 diopters (D).

As described above, according to Embodiment 4 depicted in FIG. 7, when the prescription addition power ADD is 1.25 diopters (D) or more, the addition power MAD at the position corresponding to the fitting point FP is 0.25 diopters (D) or more, which is equal to or greater than the target addition power FAD. In this case, the target addition power FAD of 0.25 diopters (D), is set as the addition power between the progression-start point PS and the progression-end point PE on the principal meridian C, and in addition the average gradient M of the addition power between the progression-start point PS and the fitting point FP is set to differ from the average gradient N of the addition power between the fitting point FP and the progression-end point PE.

When the prescription addition power ADD is less than 1.25 diopters (D), on the other hand, the addition power MAD at the position corresponding to the fitting point FP is less than 0.25 diopters (D), which is smaller than the target addition power FAD. In this case, the progression-start point PS and the progression-end point PE are connected by a line L on the principal meridian C, so as to make the gradient of the addition power constant.

[Embodiment 5]

In Embodiment 5, the dimension A, the dimension B, and the target addition power FAD are different from Embodiment 3, but the other conditions are the same as Embodiment 3.

Figure 8:
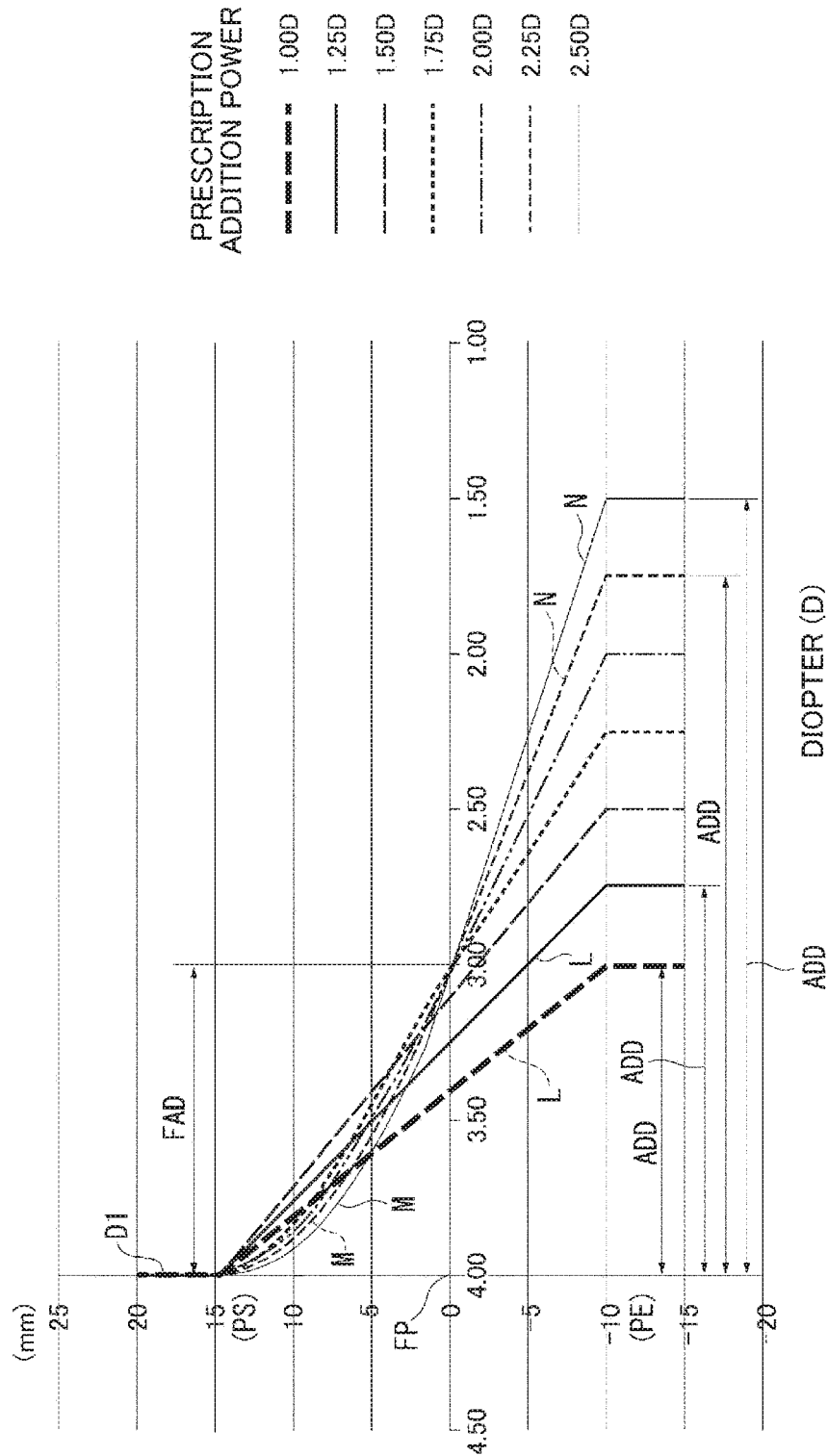
FIG. 8 is a graph depicting a designing method according to Embodiment 5, and shows the relationship between the power and position on the principal meridian when the prescription addition power is changed.

FIG. 8 shows a relationship between the position on the principal meridian and the addition power in a plurality of progressive power lenses, in which the first power D1 is fixedly set to 4.00 diopters (D), and the prescription addition power ADD is set from 1.00 diopters (D) to 2.50 diopters (D) in 0.25 diopter (D) interval. The principal meridian C in the first region 1A is on the Y axis, and the fitting point FP is located at the O position, which is the origin of the Y axis.

In Embodiment 5, the target distance d is 1 m, and the target addition power FAD is 1.00 diopters. The dimension A is set to 15 mm, and the dimension B is set to 10 mm.

When the prescription addition power ADD is 1.00 diopters (D), the addition power MAD at the position corresponding to the fitting point FP is {A/(A+B)}×ADD=0.6×1.00=0.60 diopters (D), which is smaller than the target addition power FAD of 1.00 diopters (D).

When the prescription addition power ADD is 1.25 diopters (D), the addition power MAD at the position corresponding to the fitting point FP is {A/(A+B)}×ADD=0.6×1.25=0.75 diopters (D), which is smaller than the target addition power FAD of 1.00 diopters (D).

When the prescription addition power ADD is 1.50 diopters (D), the addition power MAD at the position corresponding to the fitting point FP is {A/(A+B)}×ADD=0.6×1.50=0.90 diopters (D), which is smaller than the target addition power FAD of 1.00 diopters (D).

When the prescription addition power ADD is 1.75 diopters (D), the addition power MAD at the position corresponding to the fitting point FP is {A/(A+B)}×

ADD=0.6×1.75=1.05 diopters (D), which is greater than the target addition power FAD of 1.00 diopters (D).

When the prescription addition power ADD is 2.00 diopters (D), the addition power MAD at the position corresponding to the fitting point FP is {A/(A+B)}× ADD=0.6×2.00=1.20 diopters (D), which is greater than the target addition power FAD of 1.00 diopters (D).

As described above, according to Embodiment 5 depicted in FIG. 8, when the prescription addition power ADD is 1.75 diopters (D) or more, the addition power MAD at the position corresponding to the fitting point FP is 1.05 diopters (D) or more, which is greater than the target addition power FAD. In this case, the target addition power FAD of 0.25 diopters (D), is set as the addition power between the progression-start point PS and the progression-end point PE on the principal meridian C, and in addition the average gradient M of the addition power between the progression-start point PS and the fitting point FP is set to differ from the average gradient N of the addition power between the fitting point FP and the progression-end point PE.

When the prescription addition power ADD is 1.50 diopters (D) or less, on the other hand, the addition power MAD at the position corresponding to the fitting point FP is 0.90 diopters (D) or less, which is smaller than the target addition power FAD. In this case, the progression-start point PS and the progression-end point PE are connected by line L on the principal meridian C, so as to make the gradient of the addition power constant.

The lens groups of which conditions were described in Embodiment 1 to Embodiment 5 constitute a lens set which satisfies conditions that: the first region 1A having different first powers D1 can be selected; a plurality of prescription addition powers ADDs can be selected for the first region 1A having the same first power D1; refractive indexes of materials are the same; and the design concept is consistent among respective progressive power lenses.

The design concept is that, the balance of aberration distribution (basic design) does not change even if the prescription addition power changes, and may be also embodied with the same product name. The design concept may also be a concept that clear vision can be provided as long as target distances to target positions desired by the user are the same, even if the prescription addition power ADD changes in a vicinity of the fitting point.

In this invention, a suitable lens can be selected depending on whether or not the addition power MAD at the position corresponding to the fitting point FP, within the prescription addition power ADD, is greater than the target addition power FAD.

Therefore even if a lens must be replaced with a lens having a greater prescription addition power ADD due to the progress of presbyopia, a lens having less discomfort upon changing lens can be provided, as long as the lens can be selected from the same lens set. In other words, when the target addition power FAD is smaller than the addition power MAD at the position corresponding to the fitting point FP, no major difference is generated in vision (field of view) before and after replacing the lens, since degradation in the optical performance is suppressed. Furthermore, when the target addition power FAD is equal to or greater than the addition power MAD at the position corresponding to the fitting point FP, the distance point is fixed, hence discomfort hardly exists in viewing way in the vicinity of the fitting point before and after lens replacement. Discomfort when the lens is replaced is a major reason of poor wearing experience, and the lens set having characteristics of this invention is effective in preventing this problem of poor wearing experience.

Comparative embodiments will be described with reference to FIG. 9 to FIG. 12.

First Comparative Embodiment 1 will be described with reference to FIG. 9 and FIG. 10.

Comparative Embodiment 1 is a progressive power lens in PTL 1, which is designed under the same conditions as Embodiment 1.

Figure 9:
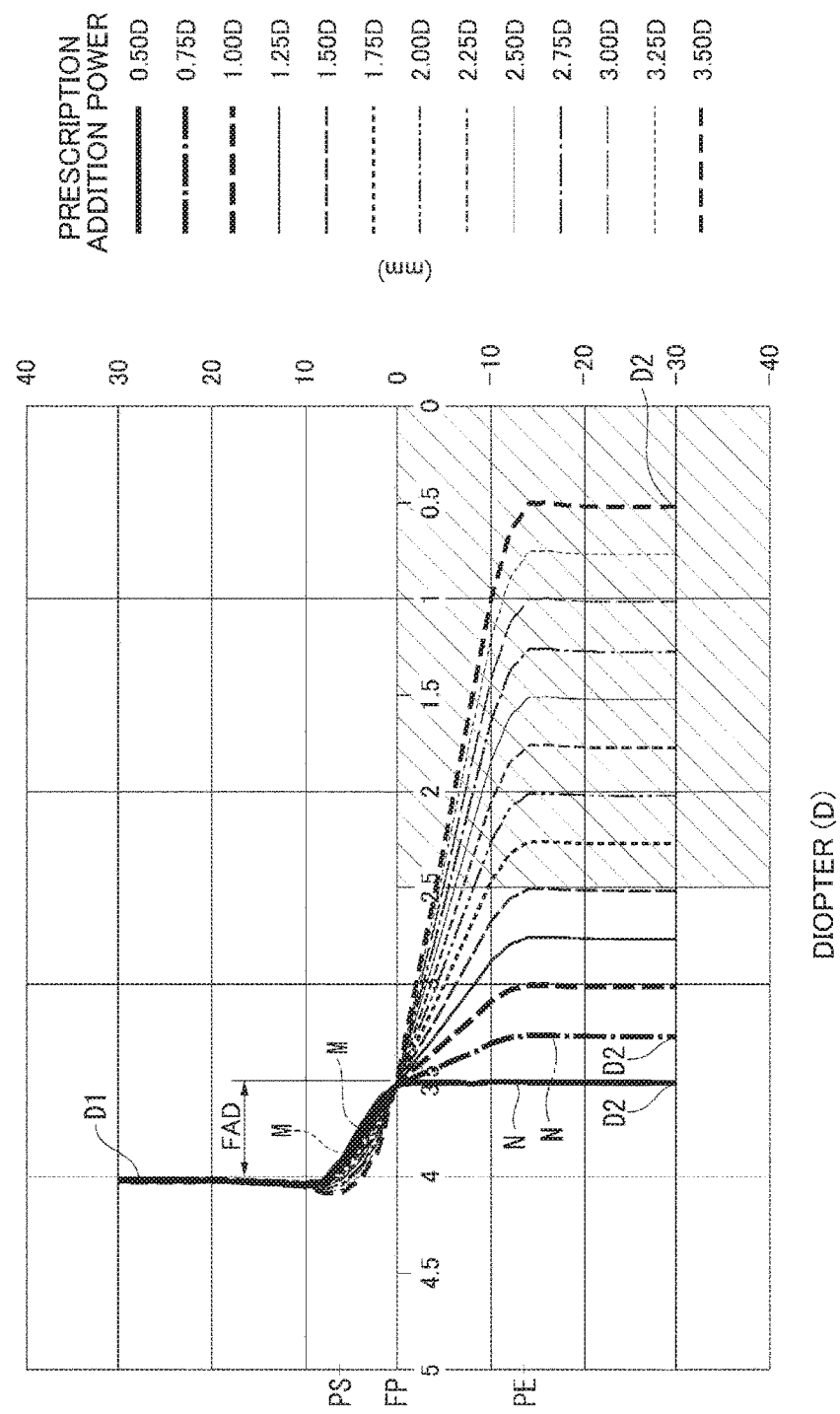
FIG. 9 is a graph depicting a designing method according to Comparative Embodiment 1, and shows the relationship between the power and position on the principal meridian when the prescription addition power is changed.

FIG. 9 shows a relationship between the position on the principal meridian and the addition power in a plurality of progressive power lenses, in which the first power D1 is fixedly set to 4.00 diopters (D), and the prescription addition power ADD is set from 0.50 diopters (D) to 3.50 diopters (D) in 0.25 diopter (D) interval, in Comparative Embodiment 1.

In Comparative Embodiment 1, the target distance d is 2 m, and the target addition power FAD is 0.50 diopters (D), just like Embodiment 1, but unlike Embodiment 1, the target addition power FAD is set at a position corresponding to the fitting point FP, regardless the amount of the prescription addition power ADD. There is no problem in representing a value of the amount of the prescription addition power ADD with shadow (1.50 diopters (D) or more), but when the prescription addition power ADD is smaller than this value, the difference of the average gradient M of the addition power between the progression-start point PS and the fitting point FP and the average gradient N of the addition power between the fitting point FP and the progression-end point PE is too large, which causes eye fatigue to the user.

Figure 10:
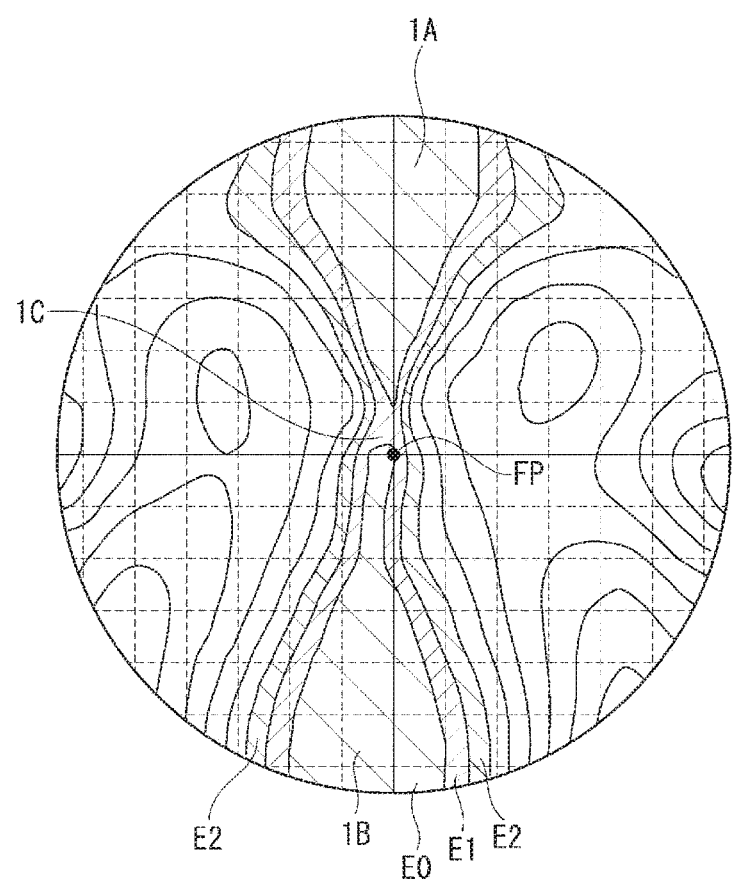
FIG. 10 is an aberration map of an example of a progressive power lens designed according to Comparative Embodiment 1.

FIG. 10 is an aberration map of the progressive power lens designed in Comparative Embodiment 1, in which the prescription addition power ADD is 1.0 diopters (D).

In FIG. 10, E0 is a region in which aberration is the smallest (0.00-0.10 diopters (D)), E1 is a region in which aberration is the next smaller (0.10-0.20 diopters (D)), and E2 is a region in which aberration is the next smaller (0.20-0.30 diopters (D)).

As depicted in FIG. 10, the region E0 in which aberration is the smallest is located in the center portion of the first region 1A and the center portion of the second region 1B. The region E1 is located outside the region E0 and in the intermediate region 1C, and the fitting point FP passes through the region E1. The region E2 is located on both sides of the region E1.

The comparison of FIG. 3 of Embodiment 1 and FIG. 10 of Comparative Embodiment 1 shows, the aberration distribution of Embodiment 1 is better than Comparative Embodiment 1.

Comparative Embodiment 2 will be described with reference to FIG. 11 and FIG. 12.

Comparative Embodiment 2 is the progressive power lens in PTL 1, which is designed under the same conditions as Embodiment 2.

Figure 11:
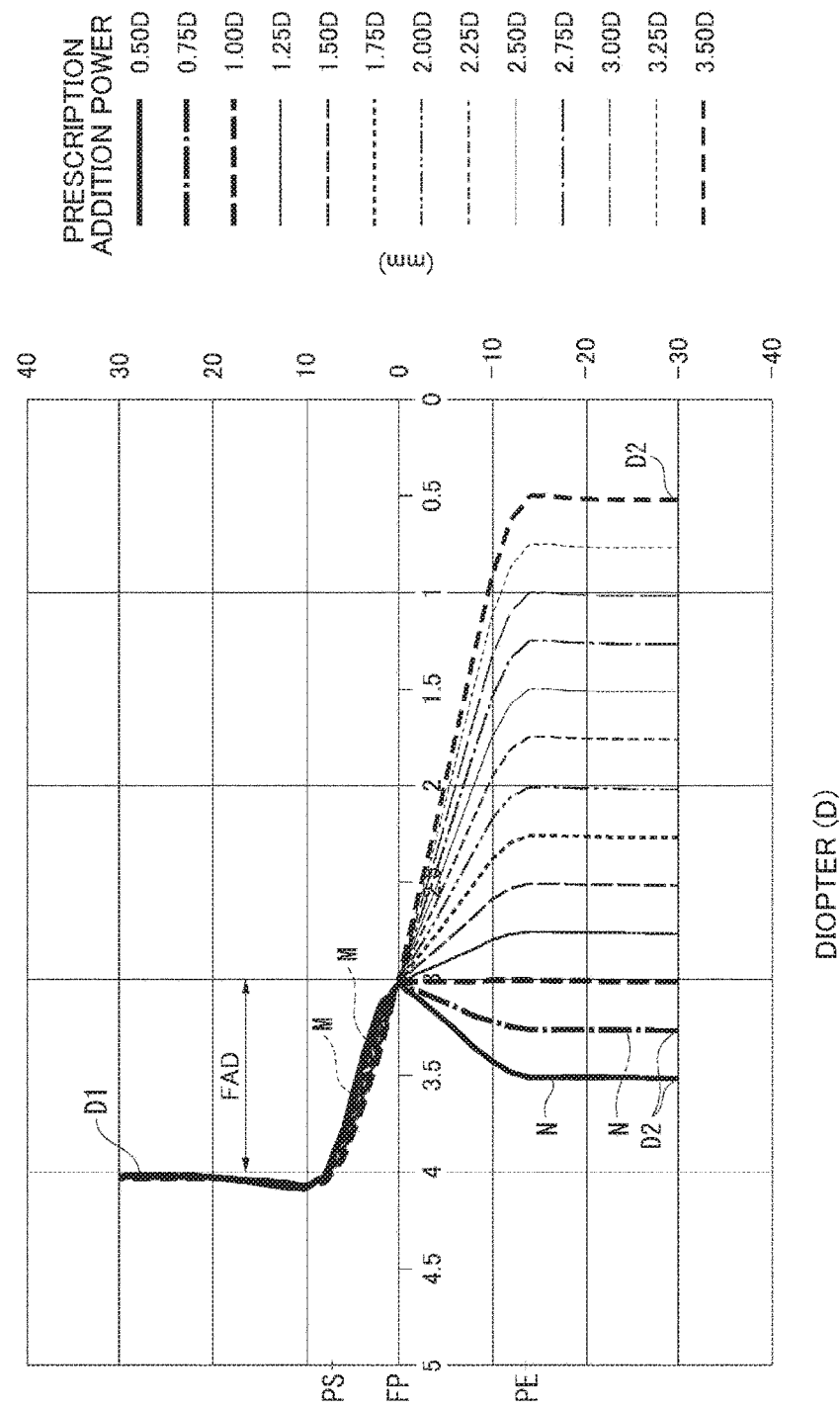
FIG. 11 is a graph depicting a designing method according to Comparative Embodiment 2, and shows the relationship between the power and position on the principal meridian when the prescription addition power is changed.

FIG. 11 shows a relationship between the position on the principal meridian and the addition power in a plurality of progressive power lenses, in which the first power D1 is fixedly set to 4.00 diopters (D), and the prescription addition power ADD is set from 0.50 diopters (D) to 3.50 diopters (D) in 0.25 diopter (D) interval, in Comparative Embodiment 2.

In Comparative Embodiment 2, the target distance d is 1 m, and the target addition power FAD is 1.00 diopters (D), just like Embodiment 2, but unlike Embodiment 2, the target addition power FAD is set at a position corresponding to the fitting point FP, regardless the amount of the prescription addition power ADD. There is no problem if the prescription addition power ADD is 2.50 diopters (D) or more, but if the prescription addition power ADD is smaller than this value, the difference of the average gradient M of the addition power between the progression-start point PS and the fitting point FP and the average gradient N of the addition power between the fitting point FP and the progression-end point PE is too large, which causes eye fatigue to the user.

Figure 12:
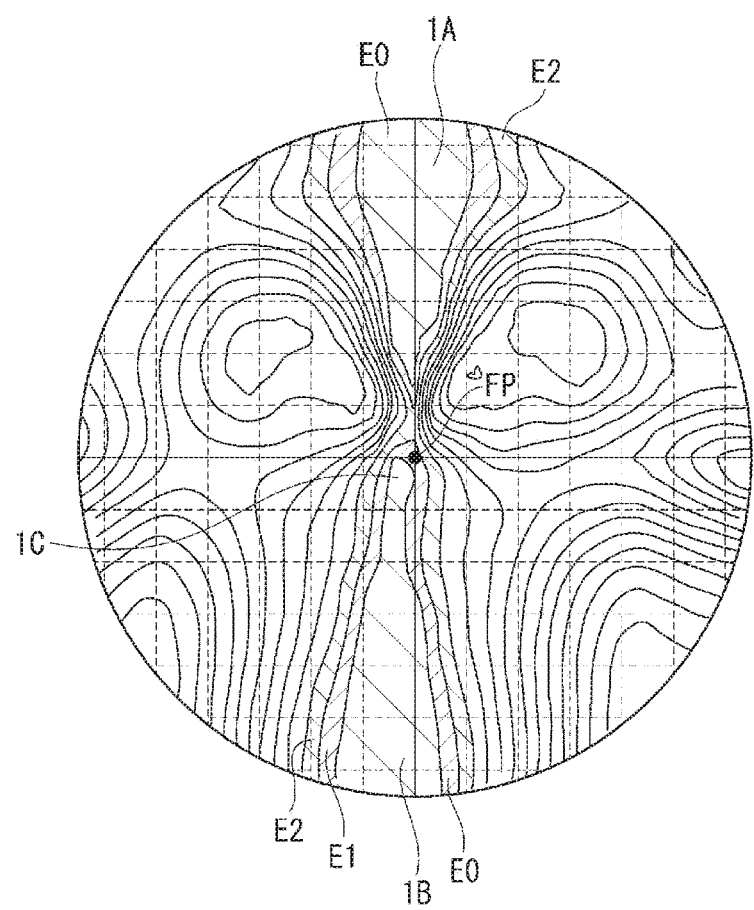
FIG. 12 is an aberration map of an example of a progressive power lens designed according to Comparative Embodiment 2.

FIG. 12 is an aberration map of the progressive power lens designed in Comparative Embodiment 2, in which the prescription addition power ADD is 1.50 diopters (D).

In FIG. 12, E0 is a region in which aberration is the smallest (0.00-0.10 diopters (D)), E1 is a region in which aberration is the next smaller (0.10-0.20 diopters (D)), and E2 is a region in which aberration is the next smaller (0.20-0.30 diopters (D)).

As depicted in FIG. 12, the region E0 in which aberration is the smallest is located in the center portion of the first region 1A and the center portion of the second region 1B, and the region E1 is located on both sides of the region E0. The region E2 is located outside the region E1 and in the intermediate region 1C, and the fitting point FP passes through the region E2.

The comparison of FIG. 5 of Embodiment 2 and FIG. 12 of Comparative Embodiment 2 shows, the aberration distribution of Embodiment 2 is better than Comparative Embodiment 2.

A method of designing the progressive power lens according to embodiments will be described next with reference to FIG. 13.

Figure 13:
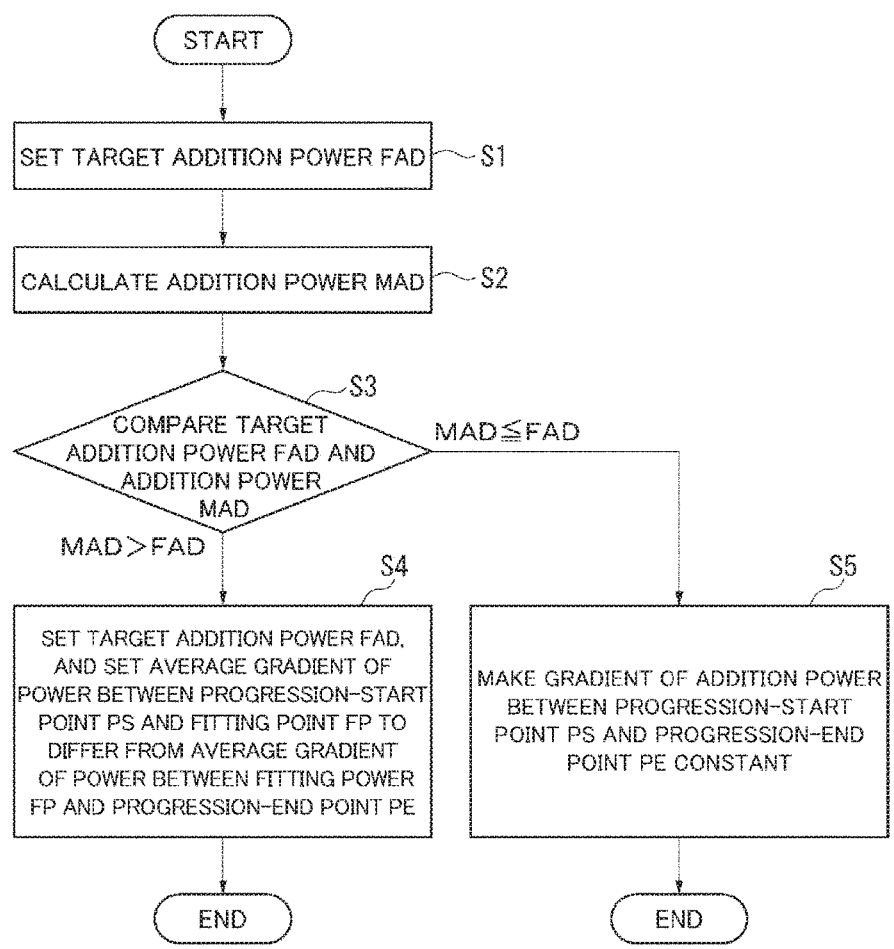
FIG. 13 is a flow chart depicting the method of designing the progressive power lens according to embodiments.

In FIG. 13, the target addition power FAD is set according to the target distance d (S1) first. Then, the addition power MAD at the position corresponding to the fitting point FP, within the prescription addition power ADD, is calculated (S2).

Then, the amounts of the target addition power FAD and the addition power MAD are compared (S3).

When the addition power MAD is greater than the target addition power FAD (MAD>FAD), the target addition power FAD is set as the addition power between the progression-start point PS and the progression-end point PE on the principal meridian C, and in addition the average gradient of the power between the progression-start point PS and the fitting point FP is set to differ from the average gradient of the power between the fitting point FP and the progression-end point PE (S4).

In contrast, when the addition power MAD is equal to or smaller than the target addition power FAD (MAD≤FAD), the gradient of the addition power between the progression-start point PS and the progression-end point PE on the principal meridian is made constant (S5).

Furthermore, the present invention is not limited to the above mentioned embodiment, but includes modifications and improvements within a scope of achieving the object of the invention.

For example, in the embodiment, considering that the lines of sight shift inward toward the nose by convergence in the case of near vision, the principal meridian C is constituted by: the linear portion C1 which corresponds to the first region 1A and is set on the vertical Y axis; the linear portion C2, which corresponds to the second region 1B, and is set to be parallel with the Y axis and distant from the Y axis in the X axis direction by dimension I; and the linear portion C3, which corresponds to the intermediate region 1C, and connects the progression-start point PS and the progression-end point PE, but in the present invention, the principal meridian C may be linearly formed along the Y axis across the first region 1A, the intermediate region 1C and the second region 1B. Further, the vertical line segments along the principal meridian are not limited to being set on the Y axis, but may be set to be distant from the Y axis in the X axis direction and parallel with the Y axis.

Further, in the configuration of embodiments, the dimension A and the dimension B are set in advance, but in the present invention, the dimension A and the dimension B may be variable, depending on the changes in the prescription addition power ADD and other parameters.

In the progressive power lens 1 designed in embodiments, the eyeball side is the progressive surface, and the object side is the spherical surface, but in the present invention, both surfaces of the eyeball side and the object side, or only the object side, may be designed as the progressive surface. The other surface that is not the progressive surface may be an aspherical surface.

The invention claimed is:

1. A method of designing a progressive power lens in which: an intermediate region where an addition power continuously changes is provided between a first region for providing a first power and a second region for providing a second power; a principal meridian is provided in the first region, the intermediate region and the second region, so that the principal meridian passes through a progression-start point at which the change in the addition power starts and a progression-end point at which the change in the addition power ends; a prescription addition power is set based on the difference between the first power and the second power; and a fitting point is set at a position between the progression-start point and the progression-end point, along an extended line of a portion of the principal meridian that passes through the first region, wherein when an addition power at a position corresponding to the fitting point within the prescription addition power is greater than a target addition power which is set according to a target distance, the target addition power is set as an addition power between the progression-start point and the progression-end point on the principal meridian, and in addition, an average gradient of an addition power between the progression-start point and the fitting point is set to differ from an average gradient of an addition power between the fitting point and the progression-end point, and when the addition power at the position corresponding to the fitting point within the prescription addition power is equal to or smaller than the target addition power, a gradient of the addition power is made constant in a partial region including at least the fitting point between the progression-start point and the progression-end point on the principal meridian.

2. The method of designing a progressive power lens according to claim 1, wherein when d represents the target distance, A represents a dimension between the progression-start point and the fitting point along the extended line, B represents a dimension between the fitting point and the progression-end point along the extended line, and ADD represents the prescription addition power, in the case of $(1/d) < \{A/(A+B)\} \times ADD$, the target addition power is set as the addition power between the progression-start point and the progression-end point on the principal meridian, and in addition the average gradient of the addition power between the progression-start point and the fitting point is set to differ from the average gradient of the addition power between the fitting point and the progression-end point, and in the case of $(1/d) \geq \{A/(A+B)\} \times ADD$, the gradient of the addition power is made constant in the partial region including at least the fitting point between the progression-start point and the progression-end point on the principal meridian.

3. The method of designing a progressive power lens according to claim 1, comprising:

a first step of setting the target addition power according to the target distance;

a second step of determining whether the addition power at the position corresponding to the fitting point within the prescription addition power is greater than the target addition power; and a third step of setting the addition power between the progression-start point and the progression-end point on the principal meridian based on a determination result in the second step, wherein in the third step, when the addition power at the position corresponding to the fitting point within the prescription addition power is greater than the target addition power which is set according to the target distance, the target addition power is set as the addition power between the progression-start point and the progression-end point on the principal meridian, and in addition the average gradient of the addition power between the progression-start point and the fitting point is set to differ from the average gradient of the addition power between the fitting point and the progression-end point, and when the addition power at the position corresponding to the fitting point within the prescription addition power is equal to or smaller than the target addition power, the gradient of the addition power is made constant in the partial region including at least the fitting point between the progression-start point and the progression-end point on the principal meridian.

4. A lens set that is a set of progressive power lenses in each of which: an intermediate region where an addition power continuously changes is provided between a first region for providing a first power and a second region for providing a second power; a principal meridian is provided in the first region, the intermediate region, and the second region, so that the principal meridian passes through a progression-start point at which the change in the addition power starts and a progression-end point at which the change in the addition power ends; a prescription addition power is set based on the difference between the first power and the second power; and a fitting point is set at a position between the progression-start point and the progression-end point, along an extended line of a portion of the principal meridian that passes through the first region, the lens set satisfying conditions that: the first region having different first powers can be selected; a plurality of prescription addition powers can be selected for the first region having the same first power; refractive indexes of materials are the same; and a design concept is consistent among respective progressive power lenses, wherein the lens set comprises: a first lens in which an addition power at a position corresponding to the fitting point within the prescription addition power is greater than a target addition power which is set according to a target distance; and a second lens in which an addition power at the position corresponding to the fitting point within the prescription addition power is equal to or smaller than the target addition power, wherein in the first lens, the target addition power is set as an addition power between the progression-start point and the progression-end point on the principal meridian, and in addition an average gradient of an addition power between the progression-start point and the fitting point is set to differ from an average gradient of an addition power between the fitting point and the progression-end point, and in the second lens, a gradient of an addition power is made constant in a partial region including at least the fitting point between the progression-start point and the progression-end point on the principal meridian.

* * * * *